Dec. 29, 1931.                N. SKILLMAN                1,838,582
SHAFT MOUNTING
Filed Sept. 12, 1927

Inventor
Newton Skillman
By Whittemore Hulbert
Whittemore & Belknap
Attorneys

Patented Dec. 29, 1931

1,838,582

UNITED STATES PATENT OFFICE

NEWTON SKILLMAN, OF HIGHLAND PARK, MICHIGAN, ASSIGNOR TO O. & S. BEARING CO., OF DETROIT, MICHIGAN, A CORPORATION OF MICHIGAN

SHAFT MOUNTING

Application filed September 12, 1927. Serial No. 219,056.

The invention relates to shaft mountings and is particularly applicable to mountings for the brake cross shafts of motor vehicles. The invention has for one of its objects the provision of an improved mounting for a cross shaft which permits of present manufacturing inaccuracies and provides for proper oscillation of the cross shaft. Another object is to provide a mounting which facilitates the assembly of the parts. With these as well as other objects in view, the invention resides in the novel features of construction and combinations and arrangements of parts as more fully hereinafter set forth.

In the drawings:—

Figure 2:
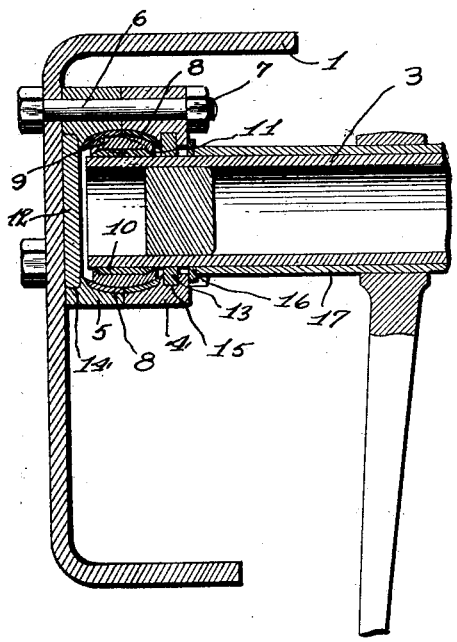
Figure 2 is a cross section on the line 2—2 of Figure 1.
Figure 2:
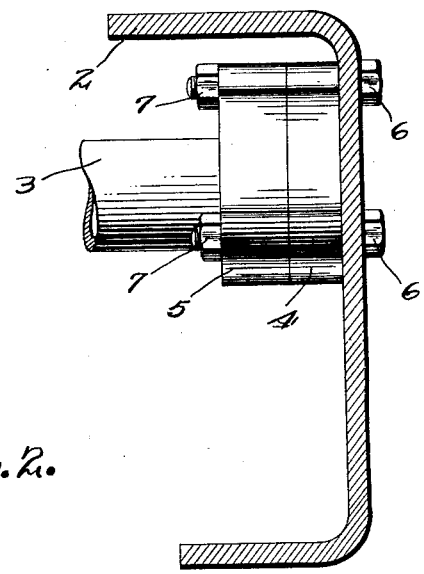
Figure 1:
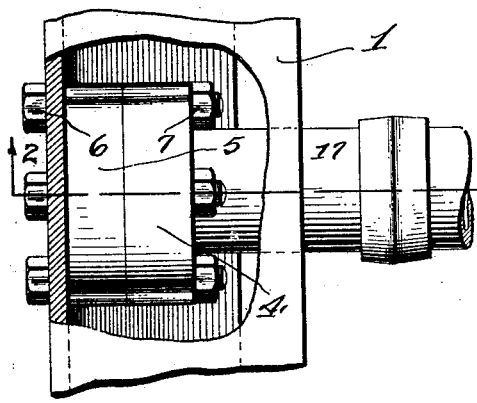
Figure 1 is a plan view of a portion of a motor vehicle chassis frame, showing the method of mounting an oscillatory brake cross shaft.
Figure 1:
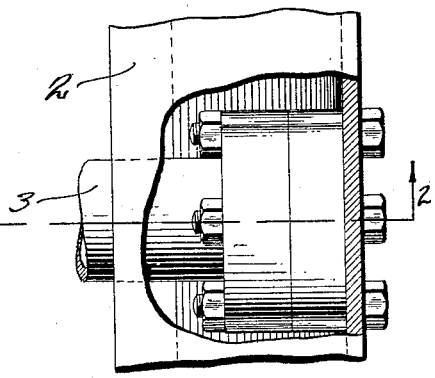
Figure 3:
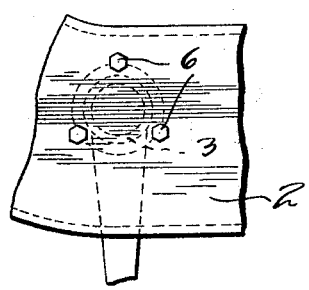
Figure 3 is a side elevation of a portion thereof.

The chassis frame of the motor vehicle has the side sills 1 and 2, which in the present instance are channel-shaped. 3 is the oscillatory brake cross shaft which may be connected to the brake pedal and brake shoes in any usual manner.

To allow for manufacturing inaccuracies in mounting the brake cross shaft upon the side sills and at the same time to mount this shaft so that it may be properly oscillated, I have provided a mounting at each end of the shaft which takes care of its oscillation as well as its angular movement. The mountings at the opposite ends are alike and therefore but one will be described. The mounting comprises the cooperating inner and outer sections 4 and 5, respectively, with the outer section adjacent the web of the side sill and both sections clamped to each other as well as clamped to the web by the bolts 6 and nuts 7, the bolts extending through the sections and the web. These sections have registering inner annular transversely concave faces which are engaged by a concavo-convex lubricant impregnated bushing 8, which latter is preferably formed of fibrous material impregnated with lubricant and highly compressed. The bushing 8 is also preferably formed of two like sections with each section fixedly secured in a section of the mounting. 9 is a frusto-spherical member engaging the bushing 8 and having an axial opening therethrough and 10 is a cylindrical lubricant impregnated bushing, preferably formed of fibrous material impregnated with lubricant and highly compressed, this bushing being fixedly secured in the opening in the frusto-spherical member, the latter having the annular flanges 11 at its ends to assist in holding the bushing from longitudinal disengagement. The shaft 3 extends through the frusto-spherical member and is journaled in the bushing 10. As a result it will be seen that angular movement of the brake cross shaft is taken care of by the frusto-spherical member moving over the concavo-convex bushing, while oscillation of the brake cross shaft is taken care of by oscillatory movement of the brake cross shaft over the cylindrical bushing.

For sealing the bearing surfaces from water, dirt and the like I have provided the packings 12 and 13, which may be formed of fibrous material. The packing 12 is in the nature of a disk and is located beyond the end of the brake cross shaft and in the recess 14 in the outer section 5 of the mounting and is clamped by this section against the web of the sill. The packing 13 is in the nature of an annulus and located in the annular groove 15 in the inner section 4 and extends to the brake cross shaft and encircles the same. I further provide the washer 16 abutting the inner side of the inner section 4 and held in place by the sleeve 17 which encircles the brake cross shaft and is suitably held from longitudinal movement thereon.

From the above description it will be seen that the parts may be readily assembled permitting of the quantity production and furthermore that the mountings at the ends of the brake cross shaft need not be accurately aligned, inasmuch as they provide for both the oscillation and angular movement of the brake cross shaft. It will be furthermore seen that by having different bushing for taking care of the oscillation and angular movement of the brake cross shaft this bushing may have longer life than if one bushing performed both functions.

What I claim as my invention is:

1. Bearing structure of the type described, comprising a frusto-spherical member having a recess in its inner wall, a bushing of lubricant impregnated fibrous material fixably secured in said opening and being highly compressed for receiving a shaft member, symmetrical mounting members forming outer bearing members having registering inner annular transversely concave faces, and highly compressed lubricant impregnated fibrous bushings fixably secured to said inner annular surfaces and preformed to each present spherical bearing surfaces for contact with said frusto-spherical member.

2. The combination with a frame, of a mounting comprising cooperating sections having registering inner annular transversely concave faces, means for securing said sections to each other, compressed lubricant impregnated fibrous bushings fixedly secured in the inner faces, and preformed to present a spherical bearing surface for contact with an integral frusto-spherical member fitting said bushing and having an axial opening, a compressed lubricant impregnated fibrous bushing in the opening and fixedly secured to said frusto-spherical member, and a shaft journaled in said last-mentioned bushing.

3. The combination of a frame and a mounting therefor, comprising cooperating annular sections secured together and to the frame by suitable securing means, said cooperating sections having registering inner annular transversely concave faces, lubricant impregnated bushings of fibrous material compressed into place in the concave faces of each cooperating section and preformed to present a spherical bearing surface for contact with a frusto-spherical member fitted in said bushing and having an axial opening, and a lubricant impregnated bushing of fibrous material compressed into place in said frusto-spherical member for receiving a rotatable shaft, said frusto-spherical member and said bushing fixedly secured therein being of less length than the two lubricant impregnated bushings in said cooperating sections.

In testimony whereof I affix my signature.

NEWTON SKILLMAN.